(No Model.)
J. H. KEYSER.
COMBINED RADIATING AND HOT WATER OR AIR HEATING FURNACE.
No. 480,103. Patented Aug. 2, 1892.
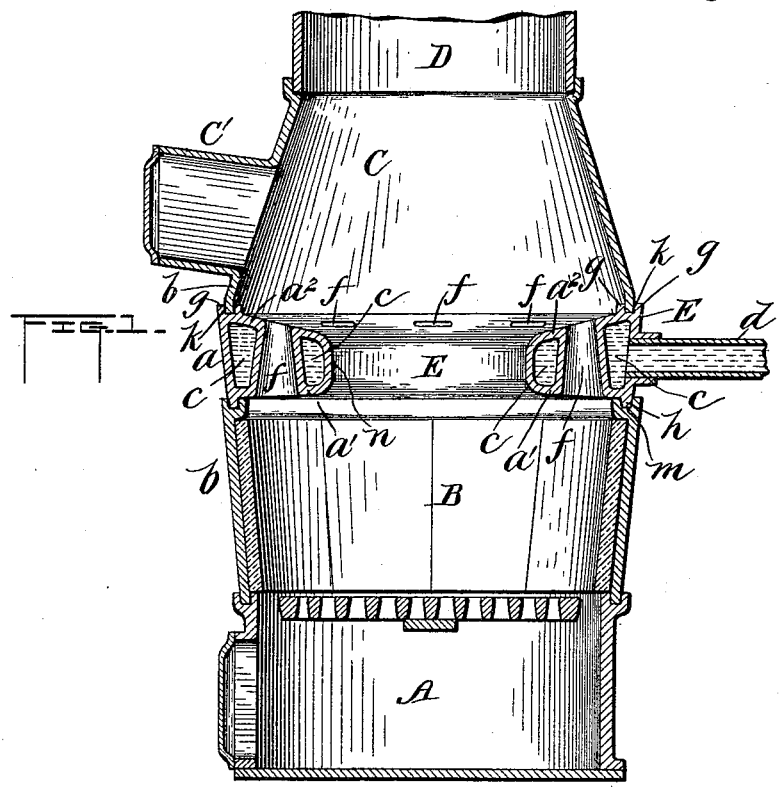
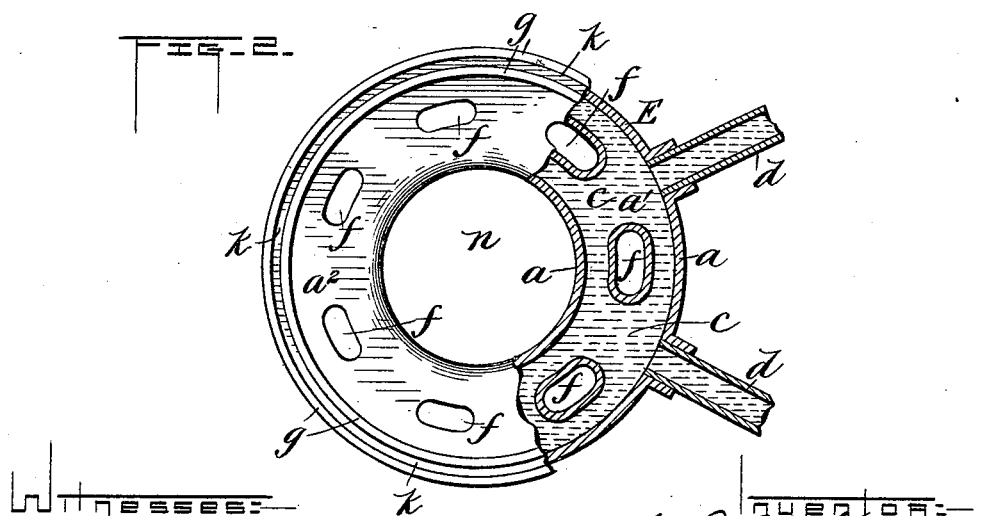

UNITED STATES PATENT OFFICE.

JOHN H. KEYSER, OF NEW YORK, N. Y.

COMBINED RADIATING AND HOT WATER OR AIR HEATING FURNACE.

SPECIFICATION forming part of Letters Patent No. 480,103, dated August 2, 1892.

Application filed January 27, 1892. Serial No. 419,452. (No model.)

*To all whom it may concern:*

Be it known that I, JOHN H. KEYSER, a citizen of the United States, residing at New York city, in the county of New York and State of New York, have invented certain new and useful Improvements in a Combined Radiating and Hot Water or Air Heating-Furnace; and I do hereby declare the following to be a full, clear, and exact description of the invention, such as will enable others skilled in the art to which it appertains to make and use the same.

My invention consists in a furnace or heating-stove constructed with an ash-pit, fire-chamber, and upper feed-door section and with a hollow water or air heating and distributing ring-section, the latter being arranged between the fire chamber or pot section and feed-door-supply section and having a central annular passage for the flame or highly-heated gases or products of combustion which is of much less diameter than the fire chamber or pot, and said ring-section also being so constructed and arranged that the bottom of its water or air chamber is acted upon directly by the flame, gases, or products of combustion as they ascend, and thus a very large portion thereof made to serve for heating the water or air in said chamber before passing off through the annular passage of the ring-section, and while this is the case the said products of combustion impinge against the surface, inclosing the annular passage, and in expanding at the top of said passage impinge upon the top surface of the hot-water chamber of the hollow ring-section, and thus water or air is effectually heated for circulation through distributing-pipes for warming rooms and for culinary and other household purposes.

My invention also consists in providing a furnace with a hollow hot-air or hot-water heating and distributing section provided with vertical flues and arranged between the fire-chamber and the upper feeding-door section and extending inward from the wall of the furnace, so as to overhang the fire-bed of the furnace to a very considerable extent, as will be hereinafter described. This construction insures contact of the flame or heated gases with the bottom and annular surface of the central passage of the hollow ring-section and by coming in contact with the vertical flues heating the air or water more effectively with a given amount of fuel, while the flues serve for dividing up the body or flow of water, and thus insuring its heating more readily.

In the drawings, Figure 1 is a vertical central section of a furnace constructed in accordance with my invention, and Fig. 2 is a view showing the furnace partly in plan and horizontal section.

A is the ash-pit; B, the fire chamber or pot; C C', the feed-door section; D, the top or finishing portion, and E the intermediate hollow hot-water or hot-air ring-section. The hot-water or hot-air section is in form of a ring, and its exterior diameter may be about the same as that of the top of the wall of the fire-chamber section B and the bottom of the feed-door section C C', it being tapered downward, so as to symmetrically unite with said sections. This ring-section E is extended inward to about one-third, more or less, of the diameter of the fire chamber or pot section B and is shaped so as to allow the flame and gases to glide freely over its inner annular surface and top surface. The wall $a$ of this ring-section is made quite as thin as the metal wall of the fire pot or chamber section B and feed-door section C C', while its hot water or air chamber $c$ is quite large, as illustrated. In the periphery of the wall $a$ hot water or air distributing pipes $d$ are inserted and allowed to communicate with the chamber $c$. There are provided, preferably, a number of flattened metal flues $f$ between the bottom and top plates $a'$ $a^2$ of the hot-water or hot-air section E. At the top of the section E near its outer periphery a channel $k$ is formed by flanges $g$, into which the lower edge of the feed-door section is inserted and properly made gas-tight, and in the bottom of the said section E a circular tongue $h$ is formed, and the same enters a channel $m$, formed in the upper edge of the fire-chamber section, and the joint is made gas-tight in any proper manner. The manner in which the sections are joined is not very material so long as the joints are made gas-tight.

It will be observed from the drawings that the section E is constructed and arranged to overhang the bed of the fire pot or chamber section A to a very considerable extent and that the flame and gases in rising will not only pass through the central annular passage *n* of the section E, but will also strike against the entire bottom surface *a'* of said section, and thus impart directly a large amount of heat to the section before passing off through the annular passage; also, that the annular surface around or about the passage will be intensely heated, and then by an expansion of the flame and gases the inclined top surface of the section will be acted upon by the flame and gases, and thus the water or air in the chamber *c* will be heated to a very high degree or to a condition suitable for warming rooms and for culinary and other household uses. The flues *f*, if used, and I prefer they should be, will serve for increasing the amount of heating-surface, and also will keep the body or flow of water divided, and thus insure its heating more rapidly.

It is very essential to provide the public with a furnace or heating-stove which is simple, portable, and capable of heating either air or water, and this can be done by the addition of my simple internally-overhanging hollow ring-section to furnaces or heaters of the class shown and described, such section being supplied with the fuel-supply-door section C C', and the fire pot or chamber section B, and such location being where the greatest amount of heat can be directly secured for heating the water or air.

The within-described hot-water or hot-air section is sometimes duplicated or triplicated when it is desired to increase the heating capacity of the furnace or stove—that is, one ring-section is placed on top of another, but all applied between the feed-door section and the fire-chamber section.

The invention, as described, can be adapted for both hot water and hot air by utilizing a section for hot air and a section for hot water, or it may be used for hot water or steam alone or hot air alone, without changing the principle of its construction.

What I claim as my invention is—

1. An updraft furnace or heating-stove constructed with a flame or hot-gas expansion feed-door section C C', an updraft-section D, a lower fire-chamber section B, an ash-pit section A, and an intermediate hollow ring-section E, having tubular flame-flues through it in communication with the chambers C and D, said section serving for heating and distributing water or air, and the same being constructed with a water or air heating chamber and a central circular passage and arranged to overhang a fire-bed below it, so that the flame passes in contact with it and through its flues and central circular passage and therefrom into the chamber C and out at a draft-passage above, said hollow rim-section being applied between the feed-door section and the fire-chamber section, and thus leaving the lower and upper portions of the furnace free to radiate heat, substantially as and for the purpose described.

2. The combination of the hollow intermediate water or air heating and distributing ring-section, the fire-bed and fire-chamber of greater diameter than the central circular passage of the ring-section, and the feed-door section having a base of greater diameter than the said circular passage of the hollow ring-section, whereby a furnace having an upper and lower radiating-surface and an intermediate water-heating portion is produced and the heat from the grate effectively brought in contact with said water-heating portion, substantially as described.

In testimony whereof I hereunto affix my signature in presence of two witnesses.

JOHN H. KEYSER.

Witnesses:
 WILLIAM TURTON,
 WILLIAM J. BARKER.